US012518691B2

(12) United States Patent
Kim et al.

(10) Patent No.: US 12,518,691 B2

(45) Date of Patent: Jan. 6, 2026

(54) DISPLAY APPARATUS AND METHOD OF DRIVING DISPLAY PANEL OF THE SAME

(71) Applicant: Samsung Display Co., Ltd., Yongin-si (KR)

(72) Inventors: Soon-Dong Kim, Osan-si (KR); Sangan Kwon, Cheonan-si (KR); Taehoon Kim, Hwaseong-si (KR); Hui Nam, Suwon-si (KR); Junheyung Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/403,199

(22) Filed: Jan. 3, 2024

(65) Prior Publication Data

US 2024/0153455 A1 May 9, 2024

Related U.S. Application Data

(63) Continuation of application No. 17/967,206, filed on Oct. 17, 2022, now Pat. No. 11,887,539, which is a (Continued)

(30) Foreign Application Priority Data

Aug. 27, 2020 (KR) ........................ 10-2020-0108558

(51) Int. Cl.

*G09G 3/3233* (2016.01)
*G09G 3/3266* (2016.01)
*G09G 5/14* (2006.01)

(52) U.S. Cl.

CPC ............. *G09G 3/3233* (2013.01); *G09G 5/14* (2013.01); *G09G 3/3266* (2013.01); (Continued)

(58) Field of Classification Search

None

See application file for complete search history.

(56) References Cited

U.S. PATENT DOCUMENTS

| | | | |
|---|---|---|---|
| 2002/0018058 | A1 | 2/2002 | Tamura |
| 2006/0262109 | A1 | 11/2006 | Park et al. |

(Continued)

FOREIGN PATENT DOCUMENTS

| | | | |
|---|---|---|---|
| CN | 106297670 | A | 1/2017 |
| KR | 1020160017290 | A | 2/2016 |
| KR | 1020180122525 | A | 11/2018 |

OTHER PUBLICATIONS

Extended European Search Report for Application No. 21193417.9-1210 dated Jan. 26, 2022.

*Primary Examiner* — Matthew Yeung

(74) *Attorney, Agent, or Firm* — CANTOR COLBURN LLP

(57) ABSTRACT

A display apparatus includes a display panel including a pixel to display an image based on input image data, a driving controller which determines a driving frequency of a first display area of the display panel to be a first driving frequency and determines a driving frequency of a second display area of the display panel to be a second driving frequency less than the first driving frequency when the first display area displays a moving image and the second display area of the display panel displays a still image, and an emission driver which outputs a moving image emission signal corresponding to the first driving frequency and a still image emission signal corresponding to the second driving frequency to the display panel. A width of a non-emission period of the still image emission signal is greater than a width of a non-emission period of the moving image emission signal.

20 Claims, 14 Drawing Sheets

Related U.S. Application Data continuation of application No. 17/328,392, filed on May 24, 2021, now Pat. No. 11,475,838.

(52) U.S. Cl.
CPC . *G09G 2310/0243* (2013.01); *G09G 2310/08* (2013.01); *G09G 2320/0233* (2013.01); *G09G 2320/10* (2013.01)

(56) References Cited

U.S. PATENT DOCUMENTS

| | | | | |
|---|---|---|---|---|
| 2007/0103408 | A1 | 5/2007 | Tada et al. | |
| 2010/0134535 | A1 | 6/2010 | Shidara et al. | |
| 2014/0320479 | A1* | 10/2014 | Kaneko | G02F 1/13306 345/212 |
| 2014/0375627 | A1 | 12/2014 | Kim et al. | |
| 2015/0138258 | A1 | 5/2015 | Lee et al. | |
| 2015/0170607 | A1 | 6/2015 | Shin | |
| 2015/0243203 | A1 | 8/2015 | Kim et al. | |
| 2016/0111055 | A1 | 4/2016 | Na et al. | |
| 2016/0379558 | A1 | 12/2016 | Jeon | |
| 2019/0096330 | A1 | 3/2019 | Kim et al. | |
| 2020/0013331 | A1* | 1/2020 | Kobayashi | G09G 3/3266 |
| 2020/0082768 | A1* | 3/2020 | Oh | G09G 3/3291 |

* cited by examiner

DISPLAY APPARATUS AND METHOD OF DRIVING DISPLAY PANEL OF THE SAME

This application is a continuation of U.S. patent application Ser. No. 17/967,206, filed on Oct. 17, 2022, which is a continuation of U.S. patent application Ser. No. 17/328,392, filed on May 24, 2021, which claims priority to Korean Patent Application No. 10-2020-0108558, filed on Aug. 27, 2020, and all the benefits accruing therefrom under 35 U.S.C. § 119, the content of which in its entirety is herein incorporated by reference.

BACKGROUND

1. Field

Embodiments of the invention relate to a display apparatus and a method of driving a display panel of the display apparatus. More particularly, embodiments of the invention relate to a display apparatus in which a width of a non-emission period of an emission signal is adjusted based on a driving frequency, and a method of driving a display panel of the display apparatus.

2. Description of the Related Art

In a display apparatus, a moving image may be displayed in a partial area of the display panel, and a still image may be displayed in the remaining area of the display panel. The partial area may be driven in a high driving frequency corresponding to the moving image, and the remaining area may be driven in a low driving frequency corresponding to the still image.

SUMMARY

In a conventional display apparatus, when a moving image is displayed in a partial area of a display panel with a high frequency and a still image is displayed in the remaining area of the display panel with a low frequency, a non-emission period of an emission signal of the display panel typically has a constant width, such that a difference of luminance due to a leakage current inside a pixel between moving and still images may be visually recognized by a user.

Embodiments of the invention provide a display apparatus in which a difference of luminance between a moving image area and a still image area of a display panel is reduced, thereby improving a display quality.

Embodiments of the invention also provide a method of driving a display panel of the display apparatus.

In an embodiment according to the invention, a display apparatus includes a display panel including a pixel, where the display panel displays an image based on input image data, a driving controller which determines a driving frequency of a first display area of the display panel to be a first driving frequency and determines a driving frequency of a second display area of the display panel to be a second driving frequency less than the first driving frequency when the first display area displays a moving image and the second display area of the display panel displays a still image, and an emission driver which outputs a moving image emission signal corresponding to the first driving frequency and a still image emission signal corresponding to the second driving frequency to the display panel. In such an embodiment, a width of a non-emission period of the still image emission signal is greater than a width of a non-emission period of the moving image emission signal.

In an embodiment, when the display panel displays only a moving images or displays only a still image, the driving controller may determine the driving frequency of the display panel to be a fixed driving frequency, and the emission driver may output an emission signal having a constant width of a non-emission period to the display panel.

In an embodiment, the width of the non-emission period of the still image emission signal may be constant, and the width of the non-emission period of the moving image emission signal may be adjusted to decrease, such that the width of the non-emission period of the still image emission signal may become greater than the width of the non-emission period of the moving image emission signal.

In an embodiment, the width of the non-emission period of the moving image emission signal may be constant, and the width of the non-emission period of the still image emission signal may be adjusted to increase, such that the width of the non-emission period of the still image emission signal may become greater than the width of the non-emission period of the moving image emission signal.

In an embodiment, the width of the non-emission period of the moving image emission signal and the width of the non-emission period of the still image emission signal may be controlled in a way such that a luminance of the second display area may be substantially the same as a luminance of the first display area.

In an embodiment, the moving image emission signal and the still image emission signal are controlled based on an emission clock signal.

In an embodiment, a width of an activation duration of the emission clock signal in the second driving frequency may be greater than a width of an activation duration of the emission clock signal in the first driving frequency.

In an embodiment, the moving image emission signal and the still image emission signal may be outputted in synchronization with a falling edge of the emission clock signal.

In an embodiment, the moving image emission signal and the still image emission signal may be controlled based on a first emission start signal and a second emission start signal.

In an embodiment, the non-emission period of the moving image emission signal may be determined based on the first emission start signal, the non-emission period of the still image emission signal may be determined according to the second emission start signal and a width of an activation duration of the second emission start signal may be greater than a width of an activation duration of the first emission start signal.

In an embodiment, positions of the first display area and the second display area may be fixed on the display panel.

In an embodiment, the moving image emission signal and the still image emission signal may be controlled by adjusting a width of an activation duration of an emission clock signal, an activation duration of a first emission start signal, and an activation duration of a second emission start signal.

In an embodiment according to the invention, a method of driving a display panel includes: determining a boundary between a first display area of the display panel and a second display area of the display panel based on input image data; determining a driving frequency of the first display area of the display panel to be a first driving frequency and determining a driving frequency of the second display area of the display panel to be a second driving frequency less than the first driving frequency when the first display area displays a moving image and the second display area displays a still image; outputting a gate signal to a gate line of the display panel; outputting a data voltage to a data line of the display panel; generating a moving image emission signal corresponding to the first driving frequency and a still image emission signal corresponding to the second driving frequency; and outputting the moving image emission signal and the still image emission signal to an emission line of the display panel. In such an embodiment, a width of a non-emission period of the still image emission signal is greater than a width of a non-emission period of the moving image emission signal.

According to embodiments of the display apparatus and the method of driving the display panel of the display apparatus, a width of a non-emission period of an emission signal in a moving image display area or a still image display area varies based on the luminance of a display image. Accordingly, in such embodiments, when the luminance of the moving image display area is relatively low, the luminance of the moving image display area may be increased to match the luminance of the still image display area. In such embodiments, when the luminance of the still image display area is relatively high, the luminance of the still image display area may be reduced to match the luminance of the moving image display area. As a result, the display quality of the display panel may be improved by reducing the difference of luminance between the moving image display area and the still image display area.

BRIEF DESCRIPTION OF THE DRAWINGS

The above and other features of the invention will become more apparent by describing in detailed embodiments thereof with reference to the accompanying drawings, in which.

DETAILED DESCRIPTION

Figure 1:
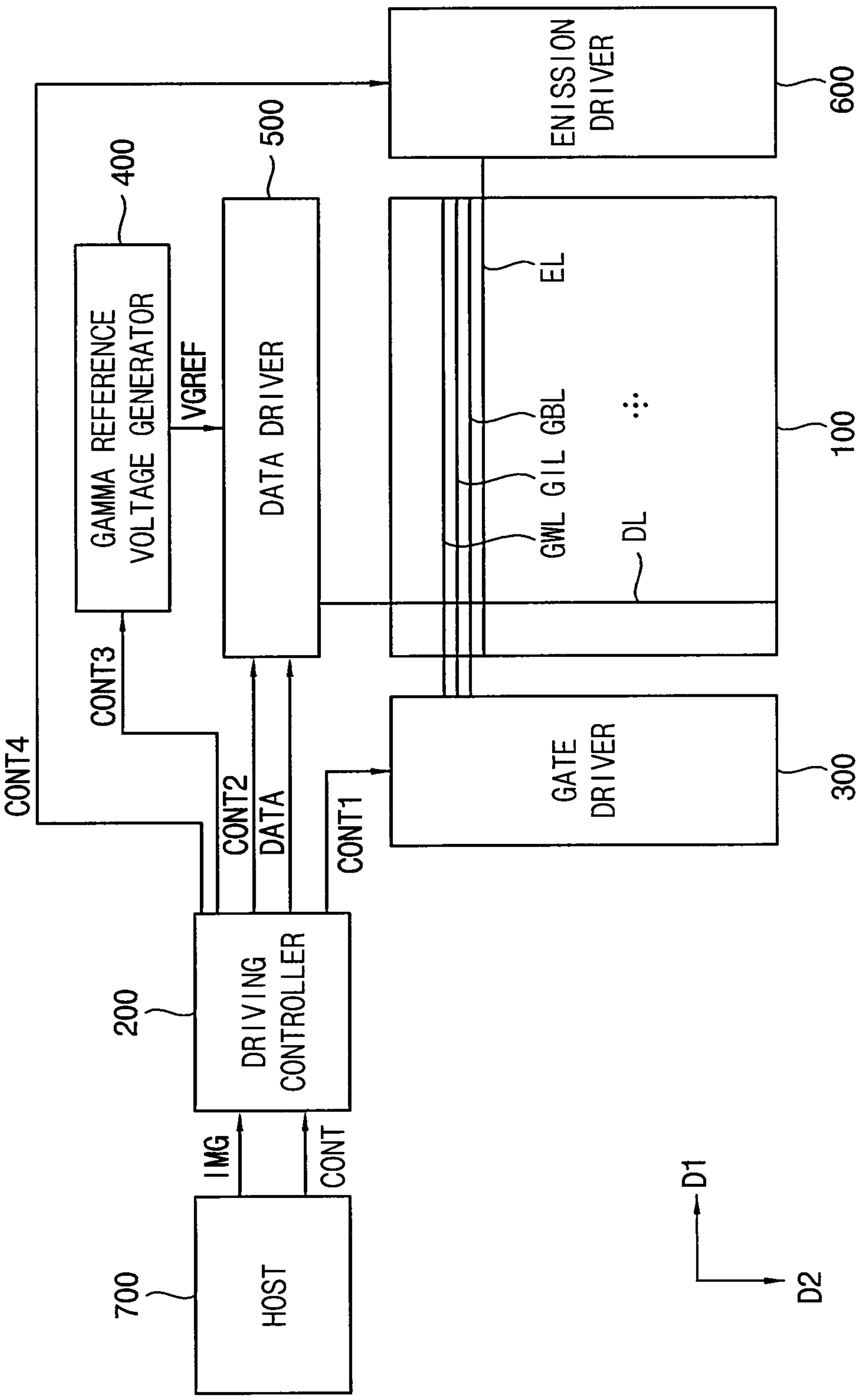
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus may include a display panel 100 and a display panel driver. The display panel driver may include a driving controller 200, a gate driver 300, a gamma reference voltage generator 400, a data driver 500, and an emission driver 600.

The display panel 100 may include a display unit for displaying an image and a peripheral unit disposed adjacent to the display unit.

The display panel 100 may include a plurality of gate lines GWL, GIL, and GBL, a plurality of data lines DL, a plurality of emission lines EL, and a plurality of pixels electrically connected to each of the gate lines GWL, GIL, GBL, the data lines DL and the emission lines EL. The gate lines GWL, GIL, and GBL extend in a first direction D1, the data lines DL extend in a second direction D2 crossing the first direction D1, and the emission lines EL extend in the first direction D1.

In one embodiment, for example, the display panel 100 may include pixels and display an image based on input image data IMG.

The display panel 100 may be driven in a normal driving mode for operating in a normal driving frequency or driven in a low frequency driving mode for operating in a frequency less than the normal driving frequency.

In one embodiment, for example, when the input image data IMG is a moving image, the display panel 100 may operate in the normal driving mode. In one embodiment, for example, when the input image data IMG is a still image, the display panel 100 may operate in the low frequency driving mode. In one embodiment, for example, when the display apparatus is in an always on mode, the display panel 100 may operate in the low frequency driving mode.

In an embodiment, a part of the input image data IMG may represent a moving image, and a part of the display panel 100 may operate in the normal driving mode. In an embodiment, a part of the input image data IMG may represent a still image, and a part of the display panel 100 may operate in the low frequency driving mode.

The display panel 100 is driven in a unit of frame, and the display panel 100 may be refreshed every frame in the normal driving mode. Accordingly, the normal driving mode may include only writing frames for writing data to the pixel.

In the low frequency driving mode, the display panel 100 may be refreshed in a frequency of the low frequency driving mode. Accordingly, the low frequency driving mode may include writing frames for writing data to the pixel and holding frames for holding the written data without writing data to the pixel.

The driving controller 200 receives input image data IMG and an input control signal CONT from a host 700. In one embodiment, for example, the input image data IMG may include red image data, green image data, and blue image data. The input image data IMG may further include white image data. Alternatively, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling the operation of the gate driver 300 based on the input control signal CONT and may output the generated first control signal CONT1 to the gate driver 300. The first control signal CONT1 may include a vertical start signal and a gate clock signal.

The driving controller 200 may generate the second control signal CONT2 for controlling the operation of the data driver 500 based on the input control signal CONT and may output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling the operation of the gamma reference voltage generator 400 based on the input control signal CONT to the gamma reference voltage generator 400.

The driving controller 200 may generate the fourth control signal CONT4 for controlling the operation of the emission driver 600 based on the input control signal CONT and may output the fourth control signal CONT4 to the emission driver 600.

The gate driver 300 may generate gate signals for driving the gate lines GWL, GIL, and GBL in response to the first control signal CONT1 received from the driving controller 200. The gate driver 300 may output the gate signals to the gate lines GWL, GIL, and GBL. In one embodiment, for example, the gate driver 300 may be disposed in or integrated on the display panel 100. In one embodiment, for example, the gate driver 300 may be disposed on or mounted on the display panel 100.

The gamma reference voltage generator 400 may generate a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to the data signal DATA.

In one embodiment, for example, the gamma reference voltage generator 400 may be disposed in the driving controller 200 or in the data driver 500.

The data driver 500 may receive the second control signal CONT2 and the data signal DATA from the driving controller 200, and the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EL in response to the fourth control signal CONT4 received from the driving controller 200. The emission driver 600 may output the emission signals to the emission lines EL. In an embodiment, as shown in FIG. 1, the gate driver 300 is disposed on a first side of the display panel 100 and the emission driver 600 is disposed on a second side opposite the first side of the display panel 100, but the invention is not limited thereto. In one alternative embodiment, for example, the gate driver 300 and the emission driver 600 may be disposed on a same side with respect to the display panel. In one embodiment, for example, the gate driver 300 and the emission driver 600 may be integrally formed as a single circuit.

The structure and the operation of the emission driver 600 will be described in detail later referring to FIGS. 5 to 7.

Figure 2:
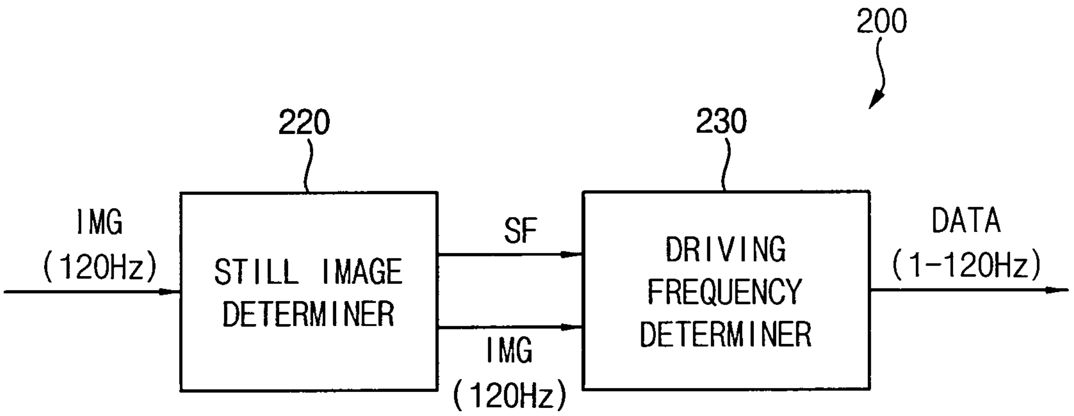
FIG. 2 is a block diagram illustrating an embodiment of a driving controller of FIG. 1.
Figure 3:
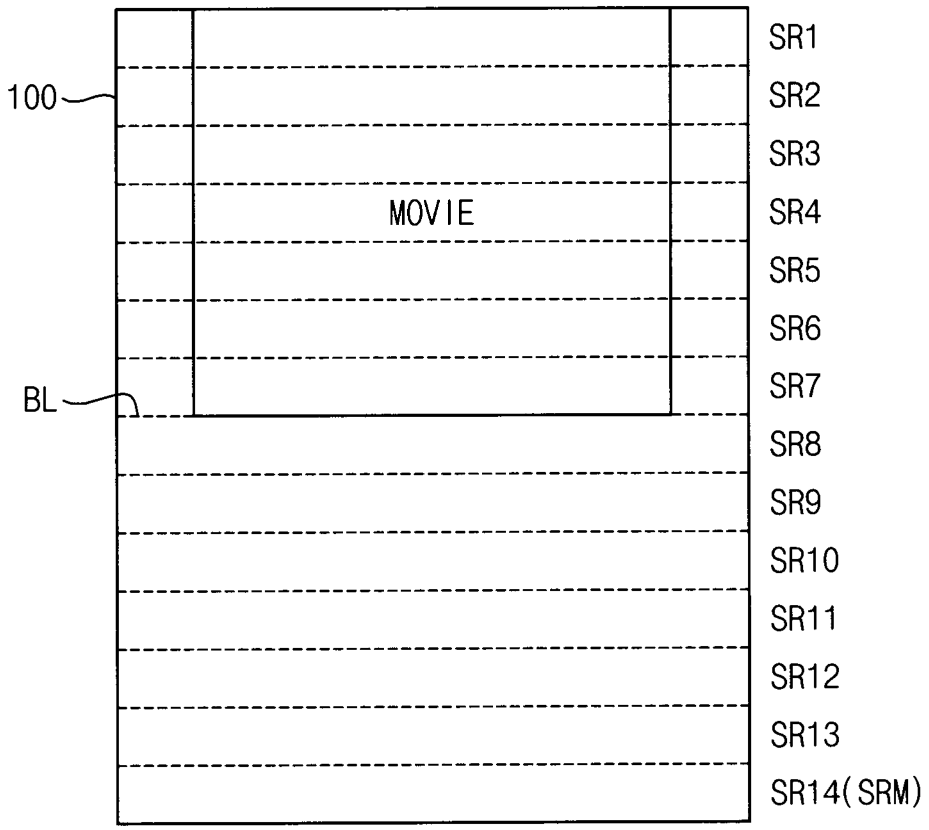
FIG. 3 is a conceptual diagram illustrating an embodiment in which a display panel of FIG. 1 is divided into a first display area and a second display area.
Figure 4:
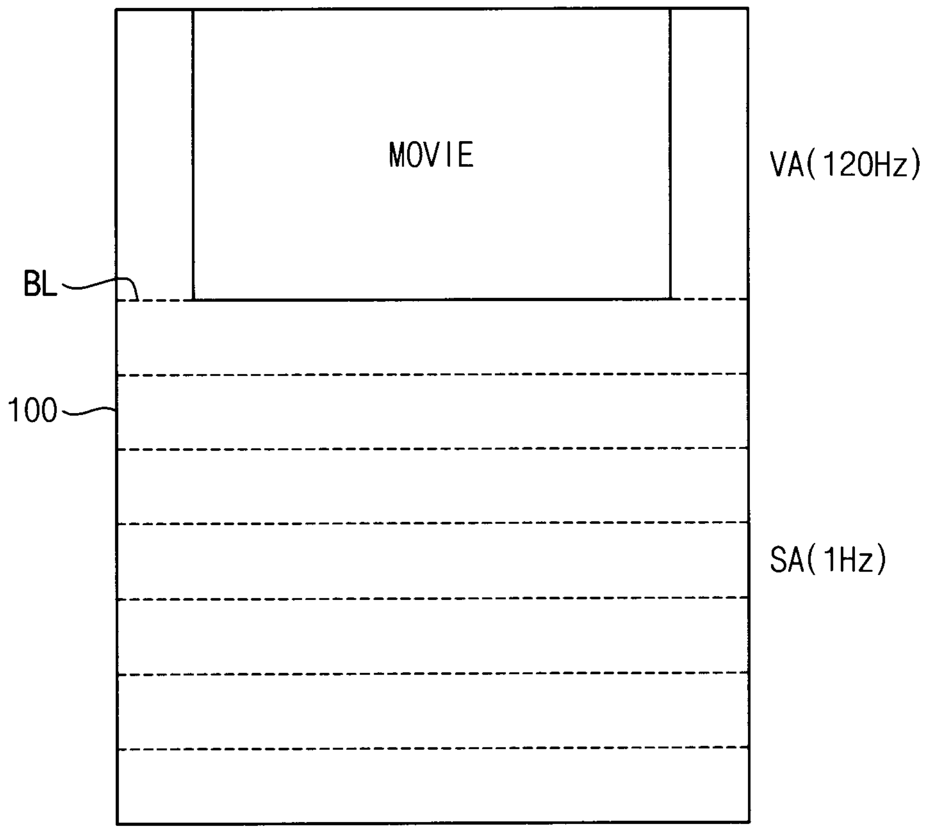
FIG. 4 is a conceptual diagram illustrating an operation of a driving frequency determiner of FIG. 2.

FIG. 2 is a block diagram illustrating an embodiment of the driving controller 200 of FIG. 1, and FIG. 3 is a conceptual diagram illustrating an embodiment in which the display panel 100 of FIG. 1 is divided into a first display area (a moving image display area) and a second display area (a still image display area), and FIG. 4 is a conceptual diagram illustrating an operation of a driving frequency determiner 230 of FIG. 2.

Referring to FIGS. 1 and 2, an embodiment of the driving controller 200 may determine a driving frequency of the first display area to be the first driving frequency (e.g., a moving image driving frequency), and a driving frequency of the second display area to be the second driving frequency (e.g., still image driving frequency) less than the first driving frequency when the first display area of the display panel 100 displays a moving image and the second display area of the display panel 100 displays a still image.

The driving controller 200 may include a still image determiner 220 and a driving frequency determiner 230.

The still image determiner 220 may determine whether each of the still image determination blocks represents a still image or a moving image. The still image determiner 220 may determine a boundary BL between the second display area (the still image display area) and the first display area (the moving image display area).

The driving frequency determiner 230 may determine a driving frequency of the second display area SA based on the input image data IMG.

Referring to FIG. 3, the still image determiner 220 may divide the input image data IMG into a plurality of still image determination blocks SR1 to SRM. In one embodiment, for example, each of the still image determination blocks SR1 to SRM may extend in a direction perpendicular to the scanning direction (e.g., D2) of the gate signal. Each of the still image determination blocks SR1 to SRM may extend in the first direction D1.

Although the number of still image determination blocks is illustrated as 14 in FIG. 3, for example, the invention may not be limited to the number of the still image determination blocks.

In an embodiment, as described above, the still image determiner 220 may determine whether each of the still image determination blocks represent a still image or a moving image. The still image determiner 220 may determine the boundary BL between the second display area (the still image display area) and the first display area (the moving image display area).

FIG. 3 illustrates a an embodiment in which a moving image is included in the first to seventh still image determination blocks SR1 to SR7 and a still image is included in the eighth to fourteenth still image determination blocks SR8 to SR14.

The still image determiner 220 may generate a flag signal SF indicating whether the still image determination blocks SR1 to SR14 represent the still image or the moving image. The still image determiner 220 may output the flag SF indicating whether the input image data IMG is a still image or a moving image to the driving frequency determiner 230. In such an embodiment, the flag signal SF may be generated for each of the still image determination blocks SR1 to SR14. In one embodiment, for example, when the still image determination block of the input image data IMG is a still image, the still image determiner 220 may output a flag of 1 to the driving frequency determiner 230, and when the still image determination block of the input image data IMG is a moving image, a flag of 0 may be output to the driving frequency determiner 230. In an embodiment, when the display panel 100 operates in an always-on display mode, the still image determiner 220 may output the flag of 1 to the driving frequency determiner 230.

Referring to FIG. 4, the driving frequency determiner 230 may determine a driving frequency of the second display area SA based on the input image data IMG.

When the flag SF is 0, the driving frequency determiner 230 may drive the switching elements in the pixel of the first display area VA in a normal driving frequency. In one embodiment, for example, when the flag SF is 0, the driving frequency determiner 230 may drive the first display area VA in a frequency of 120 hertz (Hz).

When the flag SF received from the still image determiner 220 is 1, the driving frequency determiner 230 may drive the switching elements in the pixels of the second display area SA in a low driving frequency. In one embodiment, for example, when the flag SF is 1, the driving frequency determiner 230 may drive the second display area in a driving frequency between 1 Hz and 120 Hz.

In one embodiment, for example, in FIG. 4, the first display area VA may be driven in a driving frequency of 120 Hz. In one embodiment, for example, in FIG. 4, the driving frequency determiner 230 may determine the low driving frequency of the second display area SA to be 1 Hz based on the input image data IMG corresponding to the second display area SA.

Figure 5:
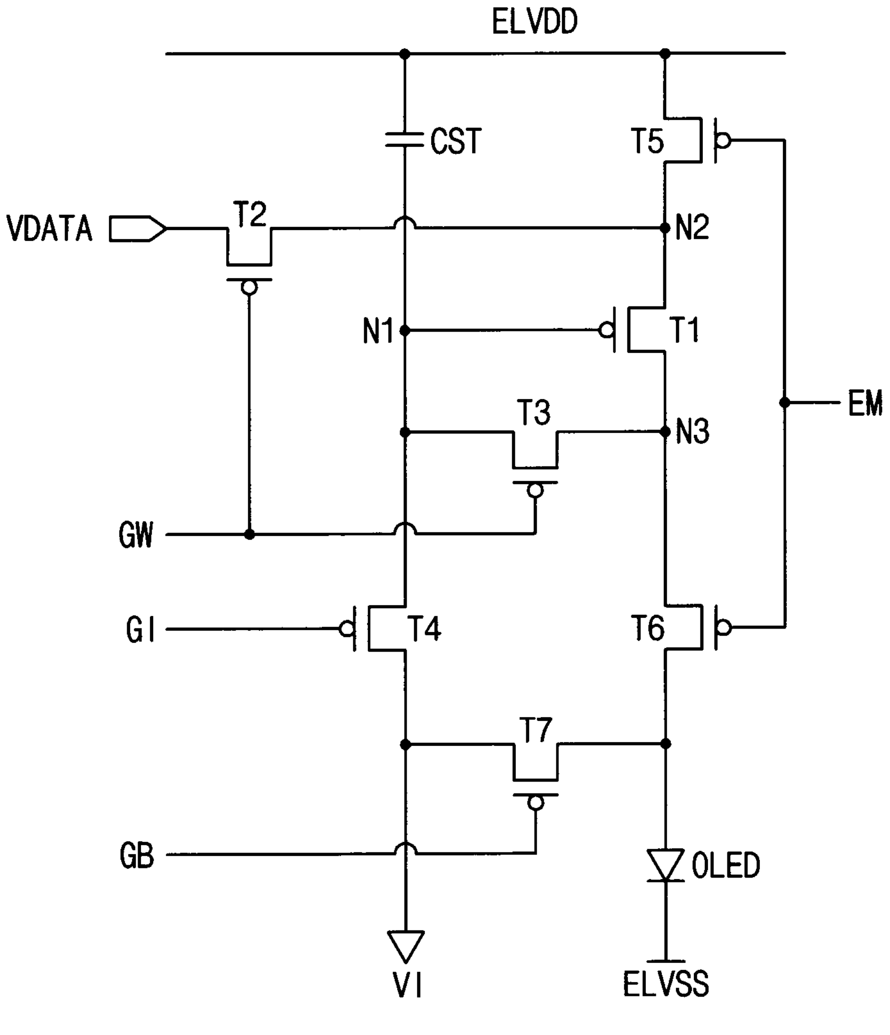
FIG. 5 is a circuit diagram illustrating an embodiment of a pixel of the display panel of FIG. 1.
Figure 6:
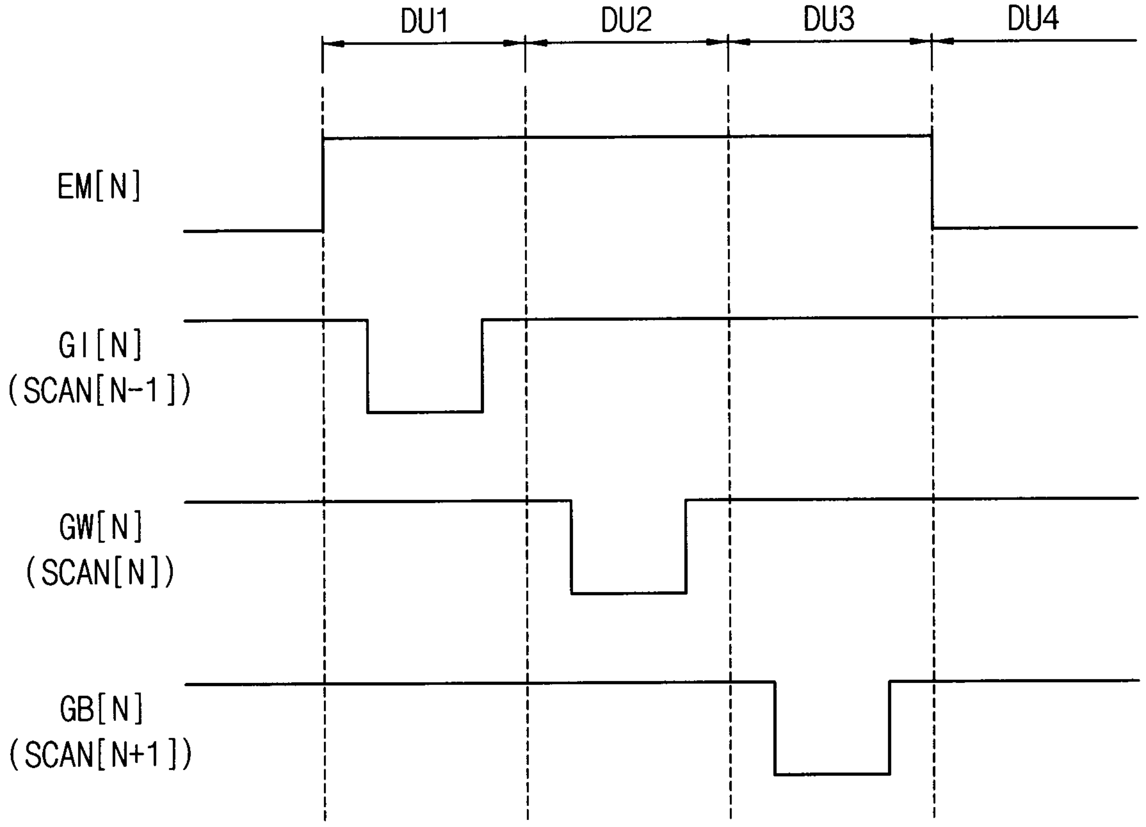
FIG. 6 is a timing diagram illustrating input signals applied to the pixel of FIG. 5.

FIG. 5 is a circuit diagram illustrating an embodiment of a pixel of the display panel 100 of FIG. 1, and FIG. 6 is a timing diagram illustrating input signals applied to the pixel of FIG. 5.

Referring to FIGS. 1, 5 and 6, an embodiment of the display panel 100 may include a plurality of pixels, and each of the pixels may include an organic light emitting element OLED.

The pixels may receive a data write gate signal GW, a data initialization gate signal GI, an organic light emitting element initialization gate signal GB, the data voltage VDATA, and the emission signal EM, and receive the data voltage. The image may be displayed by light emitted from the organic light emitting element OLED corresponding to the level of the data voltage VDATA.

At least one of the pixels may include first to seventh pixel switching elements T1 to T7, a storage capacitor CST, and the organic light emitting element OLED.

The first pixel switching element T1 may include a control electrode connected to a first pixel node N1, an input electrode connected to a second pixel node N2, and an output electrode connected to a third pixel node N3.

In one embodiment, for example, the first pixel switching element T1 may be a P-type thin film transistor. The control electrode of the first pixel switching element T1 may be a gate electrode, the input electrode of the first pixel switching element T1 may be a source electrode, and the output electrode of the first pixel switching element T1 may be a drain electrode.

The second pixel switching element T2 may include a control electrode to which the data write gate signal GW is applied, an input electrode to which the data voltage VDATA is applied, and an output electrode connected to the second pixel node N2.

In one embodiment, for example, the second pixel switching element T2 may be a P-type thin film transistor. The control electrode of the second pixel switching element T2 may be a gate electrode, the input electrode of the second pixel switching element T2 may be a source electrode, and the output electrode of the second pixel switching element T2 may be a drain electrode.

The third pixel switching element T3 may include a control electrode to which the data write gate signal GW is applied, an input electrode connected to the first pixel node N1, and an output electrode connected to the third pixel node N3.

In one embodiment, for example, the third pixel switching element T3 may be a P-type thin film transistor. The control electrode of the third pixel switching element T3 may be a gate electrode, the input electrode of the third pixel switching element T3 may be a source electrode, and the output electrode of the third pixel switching element T3 may be a drain electrode.

The fourth pixel switching element T4 may include a control electrode to which the data initialization gate signal GI is applied, an input electrode to which an initialization voltage VI is applied, and an output electrode connected to the first pixel node N1.

In one embodiment, for example, the fourth pixel switching element T4 may be a P-type thin film transistor. The control electrode of the fourth pixel switching element T4 may be a gate electrode, the input electrode of the fourth pixel switching element T4 may be a source electrode, and the output electrode of the fourth pixel switching element T4 may be a drain electrode.

The fifth pixel switching element T5 may include a control electrode to which the emission signal EM is applied, an input electrode to which a high power voltage ELVDD is applied, and an output electrode connected to the second pixel node N2.

In one embodiment, for example, the fifth pixel switching element T5 may be a P-type thin film transistor. The control electrode of the fifth pixel switching element T5 may be a gate electrode, the input electrode of the fifth pixel switching element T5 may be a source electrode, and the output electrode of the fifth pixel switching element T5 may be a drain electrode.

The sixth pixel switching element T6 is connected to a control electrode to which the emission signal EM is applied, an input electrode connected to the third pixel node N3, and an output electrode connected to an anode electrode of the organic light emitting element OLED.

In one embodiment, for example, the sixth pixel switching element T6 may be a P-type thin film transistor. The control electrode of the sixth pixel switching element T6 may be a gate electrode, the input electrode of the sixth pixel switching element T6 may be a source electrode, and the output electrode of the sixth pixel switching element T6 may be a drain electrode.

The seventh pixel switching element T7 is a control electrode to which the organic light emitting element initialization gate signal GB is applied, an input electrode to which the initialization voltage VI is applied, and an output electrode connected to the anode electrode of the organic light emitting element OLED.

In one embodiment, for example, the seventh pixel switching element T7 may be a P-type thin film transistor. The control electrode of the seventh pixel switching element T7 may be a gate electrode, the input electrode of the seventh pixel switching element T7 may be a source electrode, and the output electrode of the seventh pixel switching element T7 may be a drain electrode.

The storage capacitor CST may include a first electrode to which the high power voltage ELVDD is applied and a second electrode connected to the first pixel node N1.

The organic light emitting element OLED may include the anode electrode and a cathode electrode to which a low power voltage ELVSS is applied.

In an embodiment, as shown in FIGS. 5 and 6, the first pixel node N1 and the storage capacitor CST are initialized by the data initialization gate signal GI during a first period DU1. During a second period DU2, the threshold voltage (|VTH|) of the first pixel switching element T1 is compensated by the data write gate signal GW, and the data voltage VDATA having a component of the compensated threshold voltage (|VTH|) is written to the first pixel node N1. During a third period DU3, the anode electrode of the organic light emitting element OLED is initialized by the organic light emitting element initialization gate signal GB. During a fourth period DU4, the organic light emitting element OLED emits light by the emission signal EM, and the display panel 100 displays an image.

The data initialization gate signal GI may have an activation level in the first period DU1 as shown in FIG. 6. In one embodiment, for example, the activation level of the data initialization gate signal GI may be a low level. When the data initialization gate signal GI has the activation level, the fourth pixel switching element T4 is turned on, so that the initialization voltage VI may be applied to the first pixel node N1. The data initialization gate signal GI[N] of a current stage may be a scan signal SCAN[N−1] of a previous stage.

In the second period DU2, the data write gate signal GW may have an activation level as shown in FIG. 6. In one embodiment, for example, the activation level of the data write gate signal GW may be a low level. When the data write gate signal GW has the activation level, the second pixel switching element T2 and the third pixel switching element T3 are turned on. Also, the first pixel switching element T1 is turned on by the initialization voltage VI. The data write gate signal GW[N] of the current stage may be a scan signal SCAN[N] of the current stage.

Along the path formed by the first to third pixel switching elements T1, T2, and T3 which are turned on, a voltage subtracted from the data voltage VDATA by the threshold voltage |VTH| of the first pixel switching element T1 may be applied to the first pixel node N1.

In the third period DU3, the organic light emitting element initialization gate signal GB may have an activation level as shown in FIG. 6. In one embodiment, for example, the activation level of the organic light emitting element initialization gate signal GB may be a low level. When the organic light emitting element initialization gate signal GB has the activation level, the seventh pixel switching device T7 is turned on, so that the initialization voltage VI is applied to the anode electrode of the organic light emitting element OLED. The organic light emitting element initialization gate signal GB[N] of the current stage may be a scan signal SCAN[N+1] of a next stage.

In such an embodiment, although an activation duration of the organic light emitting element initialization gate signal GB is different from an activation duration of the data write gate signal GW, the activation duration of the organic light emitting element initialization gate signal GB may coincide with the activation duration of the data write gate signal GW. In one embodiment, for example, the organic light emitting element initialization gate signal GB[N] of the current stage may be a scan signal SCAN[N] of the current stage. In such an embodiment, the control electrode of the seventh pixel switching element T7 may be connected to the control electrode of the second pixel switching element T2.

In the fourth period DU4, the emission signal EM may have an activation level as shown in FIG. 6. In one embodiment, for example, the activation level of the emission signal EM may be a low level. When the emission signal EM has the activation level, the fifth pixel switching element T5 and the sixth pixel switching element T6 are turned on. Also, the first pixel switching element T1 is turned on by the data voltage VDATA.

A driving current may sequentially flow through the fifth pixel switching element T5, the first pixel switching element T1, and the sixth pixel switching element T6 to drive the organic light emitting element OLED. The intensity of the driving current may be determined by the level of the data voltage VDATA. The luminance of the organic light emitting element OLED may be determined by the intensity of the driving current. The driving current ISD flowing along a path from an input electrode of the first pixel switching element T1 to an output electrode of the first pixel switching element T1 may be represented as Equation 1.

$$ISD = \frac{1}{2}\mu Cox\frac{W}{L}(VSG - |VTH|)^2 \qquad \text{[Equation 1]}$$

In Equation 1, u denotes a mobility of the first pixel switching element T1, Cox denotes a capacitance per unit area of the first pixel switching element T1, and W/L denotes a ratio of a width and a length of the first pixel switching element T1, and VSG denotes a voltage between the input electrode N2 and the control electrode N1 of the first pixel switching element T1, and |VTH| denotes the threshold voltage of the first pixel switching element T1.

The voltage VG of the first pixel node N1 after the threshold voltage |VTH| is compensated in the second period DU2 may be represented as Equation 2.

$$VG = VDATA - |VTH| \qquad \text{[Equation 2]}$$

When the organic light emitting element OLED emits light in the fourth period DU4, a driving voltage VOV and the driving current ISD may be represented by Equations 3 and 4 below. In Equation 3, VS denotes the voltage of the second pixel node N2.

$$VOV = VS - VG - |VTH| = ELVDD - (VDATA - |VTH|) - |VTH| = ELVDD - VDATA \qquad \text{[Equation 3]}$$

$$ISD = \frac{1}{2}\mu Cox\frac{W}{L}(ELVDD - VDATA)^2 \qquad \text{[Equation 4]}$$

The threshold voltage (|VTH|) is compensated in the second period DU2 so that the driving current ISD may be determined independently of the threshold voltage (|VTH|) component of the first pixel switching element T1 when the organic light emitting element OLED emits light in the fourth period DU4.

Figure 7:
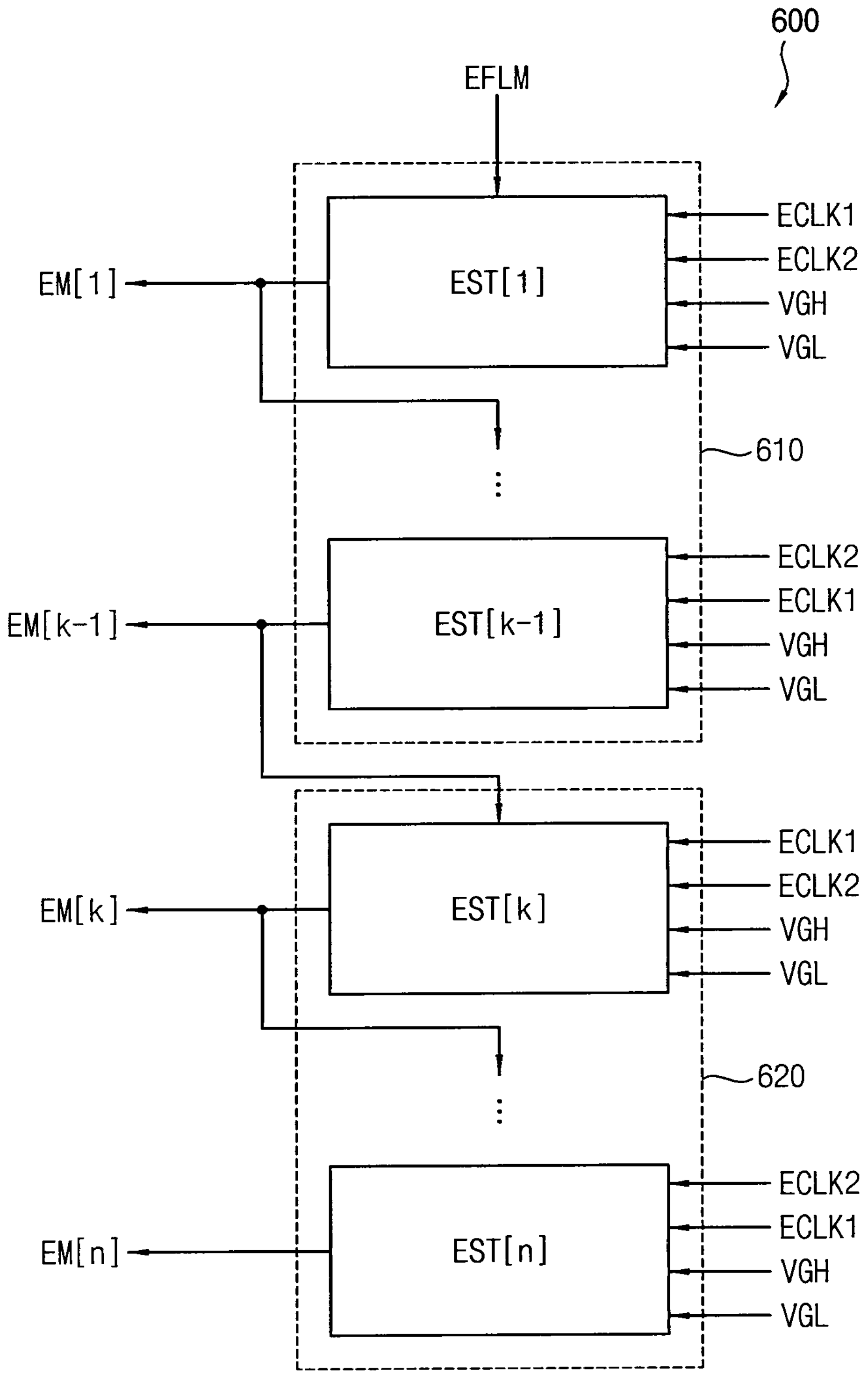
FIG. 7 is a block diagram illustrating an embodiment of an emission driver of FIG. 1.
Figure 8:
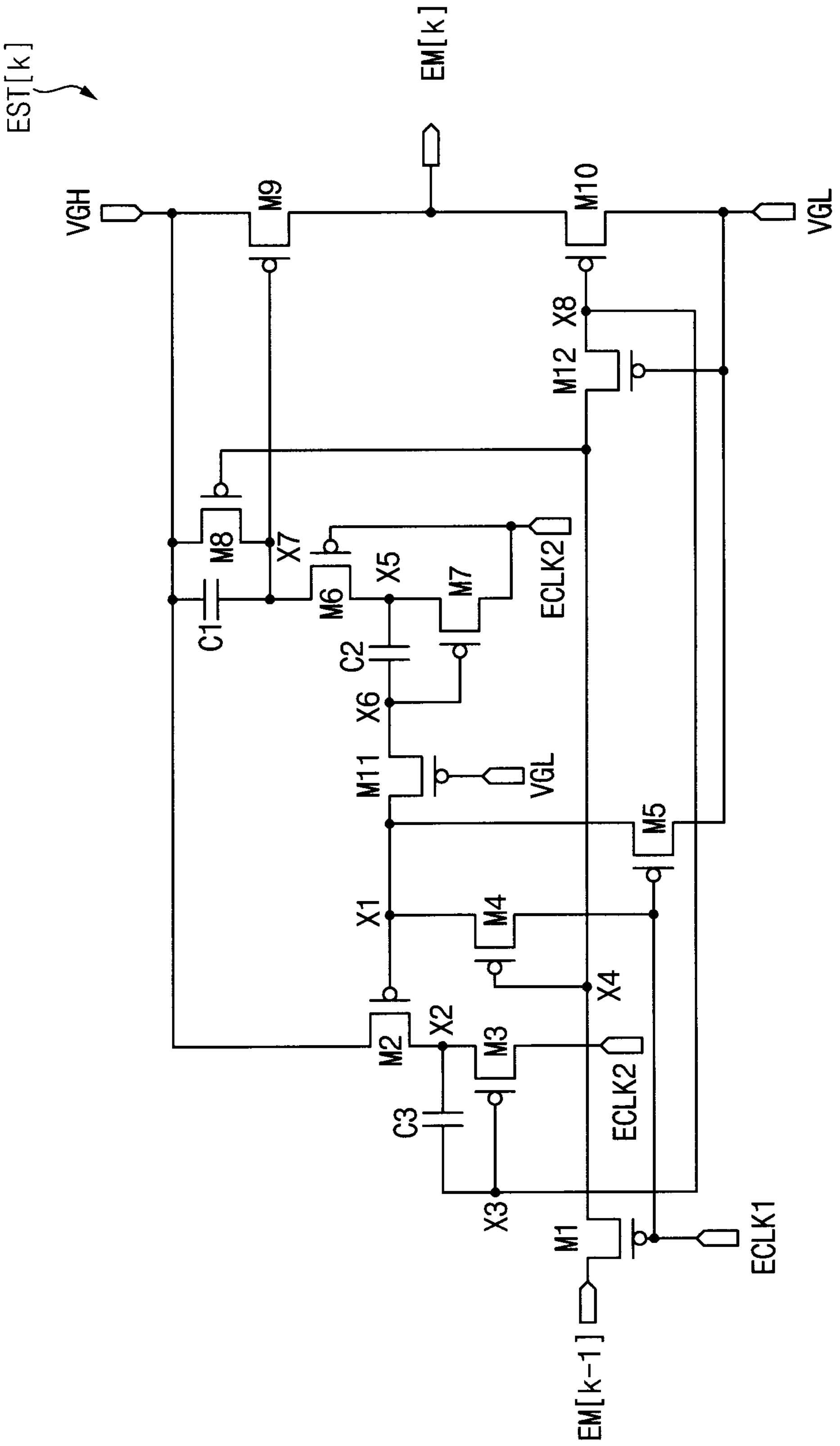
FIG. 8 is a circuit diagram illustrating an embodiment of a stage of the emission driver of FIG. 1.

FIG. 7 is a block diagram illustrating an embodiment of the emission driver 600 of FIG. 1, and FIG. 8 is a circuit diagram illustrating an embodiment of a stage of the emission driver 600 of FIG. 1.

Referring to FIG. 7, an embodiment of the emission driver 600 may include a plurality of circuit stages. The circuit stages may be connected to each other (e.g., in a cascade arrangement) to sequentially provide the emission signals to respective rows. In one embodiment, for example, a first partial emission driver 610 may include a first circuit stage EST[1] to a (k−1)-th circuit stage EST[k−1], and a second partial emission driver 620 may include a k-th circuit stage EST[k] to an n-th circuit stage EST[n].

The first circuit stage EST[1] may receive the emission start signal EFLM, the first emission clock signal ECLK1, the second emission clock signal ECLK2, a first voltage VGH, and a second voltage VGL to generate a first emission signal EM[1]. The first emission signal EM[1] may be provided to pixels disposed in a first pixel row (e.g., a first pixel row among pixel rows of the display panel 100) among the pixels and a second circuit stage.

The (k−1)-th circuit stage EST[k−1] may receive an emission signal of a previous circuit stage, the first emission clock signal ECLK1, the second emission clock signal ECLK2, a first voltage VGH, and a second voltage VGL to generate a (k−1)-th emission signal EM[k−1]. The (k−1)-th emission signal EM[k−1] may be provided to pixels disposed in a (k−1)-th pixel row among the pixels and a k-th circuit stage.

The k-th circuit stage EST[k] may receive the emission signal EM[k−1], the first emission clock signal ECLK1, the second emission clock signal ECLK2, a first voltage VGH, and a second voltage VGL to generate a k-th emission signal EM[k]. The k-th emission signal EM[k] may be provided to pixels disposed in a k-th pixel row among the pixels and a k+1-th circuit stage.

The n-th circuit stage EST[n] may receive the emission signal of the previous circuit stage, the first emission clock signal ECLK1, the second emission clock signal ECLK2, the first voltage VGH, and the second voltage VGL to generate an n-th emission signal EM[n]. The n-th emission signal EM[n] may be provided to pixels disposed in an n-th pixel row among the pixels.

Referring to FIG. 8, an embodiment of the k-th circuit stage may include a ninth switching element M9 connected between a first gate power voltage terminal to which the first voltage (also referred to as the first gate power voltage) VGH is applied and an emission signal output terminal for outputting the emission signal, and a tenth switching element M10 connected between a second gate power voltage terminal to which the second voltage (also referred to as the second gate power voltage) VGL is applied and the emission signal output terminal.

The ninth switching element M9 may be a pull-up switching element for pulling up the emission signal EM[k] to the first gate power voltage VGH, and the tenth switching element M10 may be the pull-down switching element for pulling down the emission signal EM[k] to the second gate power voltage VGL.

An embodiment of the k-th circuit stage EST[k] may include a pull-down part for an operation of pulling down the emission signal EM[k] to the second gate power voltage VGL. The pull-down part may include a first switching element M1, a second switching element M2, a third switching element M3, a tenth switching element M10, and a twelfth switching element M12.

The first switching element M1 may output the emission signal EM[k−1] of the previous circuit stage (or the emission start signal EFLM) to a fourth node X4 in response to the first emission clock signal ECLK1. A control electrode of the first switching element M1 may be connected to the first clock terminal to which the first emission clock signal ECLK1 is applied, and an input electrode of the first switching element M1 may be connected to an input terminal to which the emission signal EM[k−1] of the previous circuit stage or the emission start signal EFLM is applied, and an output An electrode of the first switching element M1 may be connected to the fourth node X4.

The second switching element M2 may output the first gate power voltage VGH to a second node X2 in response to the voltage of a first node X1. The control electrode of the second switching element M2 may be connected to the first node X1, the input electrode of the second switching element M2 may be connected to the first gate power voltage terminal, and the output electrode of the second switching element M2 may be connected to the second node X2.

The third switching element M3 may output the second emission clock signal ECLK2 to the second node X2 in response to the voltage of the third node X3. A control electrode of the third switching element M3 may be connected to the third node X3, an input electrode of the third switching element M3 may be connected to the second clock terminal to which the second emission clock signal ECLK2 is applied, and an output electrode of the third switching element M3 may be connected to the second node X2.

The tenth switching element M10 may output the second gate power voltage VGL to an output terminal for outputting the emission signal EM[k] in response to the voltage of an eighth node X8. A control electrode of the tenth switching element M10 may be connected to the eighth node X8, an input electrode of the tenth switching element M10 may be connected to the second gate power voltage terminal, and an output electrode of the tenth switching element M10 may be connected to the output terminal.

The twelfth switching element M12 may output the voltage of the fourth node X4 to the eighth node X8 in response to the second gate power voltage VGL. A control electrode of the twelfth switching element M12 may be connected to the second gate power voltage terminal, an input electrode of the twelfth switching element M12 may be connected to the fourth node X4, and an output electrode of the twelfth switching element M12 may be connected to the eighth node X8.

An embodiment of the k-th circuit stage EST[k] may include a pull-up part involved in an operation of raising the emission signal EM[k] to the first gate power voltage VGH. The pull-up part may include a fourth switching element M4, a fifth switching element M5, a sixth switching element M6, a seventh switching element M7, an eighth switching element M8, a ninth switching element M9 and an eleventh switching element M11.

The fourth switching element M4 may output the first emission clock signal ECLK1 to the first node X1 in response to the voltage of the fourth node X4. The fourth switching element M4 may include a control electrode connected to the fourth node X4, an input electrode connected to the first clock terminal, and an output electrode connected to the first node X1.

The fifth switching element M5 may output the second gate power voltage VGL to the first node X1 in response to the first emission clock signal ECLK1. The fifth switching element M5 may include a control electrode connected to the first clock terminal, an input electrode connected to the second gate power voltage terminal, and an output electrode connected to the first node X1.

The sixth switching element M6 may connect the fifth node X5 and the seventh node X7 in response to the second emission clock signal ECLK2. The sixth switching element M6 may include a control electrode connected to the second clock terminal, an input electrode connected to the fifth node X5, and an output electrode connected to the seventh node X7.

The seventh switching element M7 may output the second emission clock signal ECLK2 to the fifth node X5 in response to the voltage of the sixth node X6. The seventh switching element M7 may include a control electrode connected to the sixth node X6, an input electrode connected to the second clock terminal, and an output electrode connected to the fifth node X5.

The eighth switching element M8 may output the first gate power voltage VGH to the seventh node X7 in response to the voltage of the fourth node X4. The eighth switching element M8 may include a control electrode connected to the fourth node X4, an input electrode connected to the first gate power voltage terminal, and an output electrode connected to the seventh node X7.

The ninth switching element M9 may output the first gate power voltage VGH to the output terminal in response to the voltage of the seventh node X7. The ninth switching element M9 may include a control electrode connected to the seventh node X7, an input electrode connected to the first gate power voltage terminal, and an output electrode connected to the output terminal.

The eleventh switching element M11 may connect the first node X1 to the sixth node X6 in response to the second gate power voltage VGL. The eleventh switching element M11 may include a control electrode connected to the second gate power voltage terminal, an input electrode connected to the first node X1, and an output electrode connected to the sixth node X6.

An embodiment of the k-th circuit stage EST[k] may further include a first capacitor C1 including a first electrode connected to the first gate power voltage terminal and a second electrode connected to the seventh node X7, a second capacitor C2 including a first electrode connected to the fifth node X5 and a second electrode connected to the sixth node X6, and a third capacitor C3 including a first electrode connected to the second node X2 and a second electrode connected to the third node X3.

The first capacitor C1 may be a stabilizing capacitor for stabilizing the voltage of the seventh node X7. The second capacitor C2 may be a boosting capacitor for sufficiently decreasing the voltage of the seventh node X7 to a low level. The third capacitor C3 may be a boosting capacitor for sufficiently decreasing the voltage of the eighth node X8 to a low level.

Figure 9:
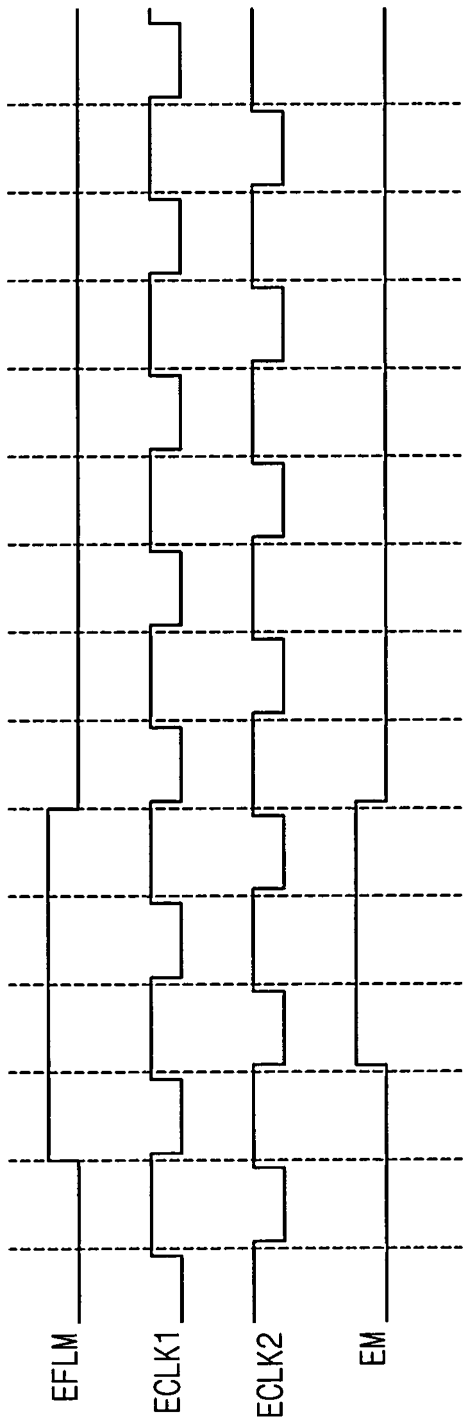
FIG. 9 is a timing diagram illustrating an emission clock signal and an emission start signal applied to the emission driver of FIG. 1, and an emission signal generated by the emission driver of FIG. 1.
Figure 10:
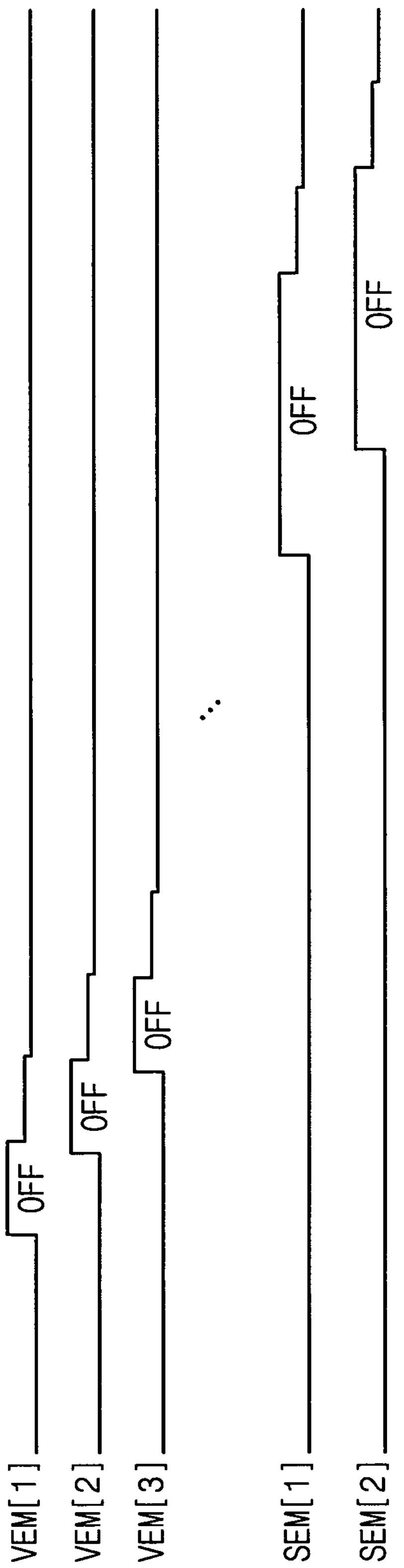
FIG. 10 is a timing diagram illustrating a moving image emission signal and a still image emission signal generated by the emission driver of FIG. 1.

FIG. 9 is a timing diagram illustrating emission clock signals ECLK1 and ECLK2 and the emission start signal EFLM applied to the emission driver 600 of FIG. 1, and the emission signal EM generated by the emission driver of FIG. 1, and FIG. 10 is a timing diagram illustrating a moving image emission signal VEM and a still image emission signal SEM generated by the emission driver 600 of FIG. 1.

Referring to FIG. 9, an embodiment of the emission signal EM may be controlled based on the first emission clock signal ECLK1, the second emission clock signal ECLK2, and the emission start signal EFLM. The emission driver 600 may output a moving image emission signal VEM corresponding to the first driving frequency and a still image emission signal SEM corresponding to the second driving frequency to the display panel 100.

Referring to FIG. 10, a width of a non-emission period of the still image emission signal SEM may be greater than a width of a non-emission period of the moving image emission signal VEM. In one embodiment, for example, when the first display area (the moving image display area) displays a moving image and the second display area (the still image display area) displays a still image, the width of the non-emission period of the still image emission signal SEM which drives the second display area (the still image display area) may be greater than the width of the non-emission period of the moving image emission signal VEM which drives the first display area (the moving image display area). According to an embodiment, an increase of luminance of a still image may be reduced by reducing a leakage current inside a pixel in the second display area (the still image display area).

In one embodiment, for example, in FIG. 10, the emission period of the emission signal may be defined a period having a low level, and the non-emission period of the emission signal may be defined as a period having a first high level or a second high level, which is higher than the low level.

In an embodiment, when the display panel 100 displays only a moving image or displays only a still image, the driving controller 200 may determine the driving frequency of the display panel 100 as a fixed driving frequency, and the emission driver 600 may output an emission signal having a constant width of a non-emission period to the display panel 100.

In an embodiment of the invention, when the width of the non-emission period of the still image emission signal SEM is constant, the width of the non-emission period of the moving image emission signal VEM is adjusted to decrease, so that the width of the non-emission period of the still image emission signal SEM is greater than the width of the non-emission period of the moving image emission signal VEM. In one embodiment, for example, when the luminance of a moving image in the first display area (the moving image display area) is lower than the luminance of a still image in the second display area (the still image display area), the width of the non-emission period of the moving image emission signal VEM is adjusted in a way such that the luminance of the first display area (the moving image display area) is substantially the same as the luminance of the second display area (the still image display area).

In an embodiment of the invention, when the width of the non-emission period of the moving image emission signal VEM is constant, the width of the non-emission period of the still image emission signal SEM is adjusted to increase, so that the width of the non-emission period of the emission signal SEM may be greater than the width of the non-emission period of the moving image emission signal VEM. In one embodiment, for example, when the luminance of a still image in the second display area (the still image display area) is higher than the luminance of a moving image in the first display area (the moving image display area), the width of the non-emission period of the still image emission signal SEM is adjusted in a way such that the luminance of the second display area (the still image display area) is substantially the same as the luminance of the first display area (the moving image display area).

According to an embodiment, as described above, the width of the non-emission period of the moving image emission signal VEM and the width of the non-emission period of the still image emission signal SEM are controlled in a way such that the luminance of the second display area (the still image display area) is substantially the same as the luminance of the first display area (the moving image display area).

Figure 11:
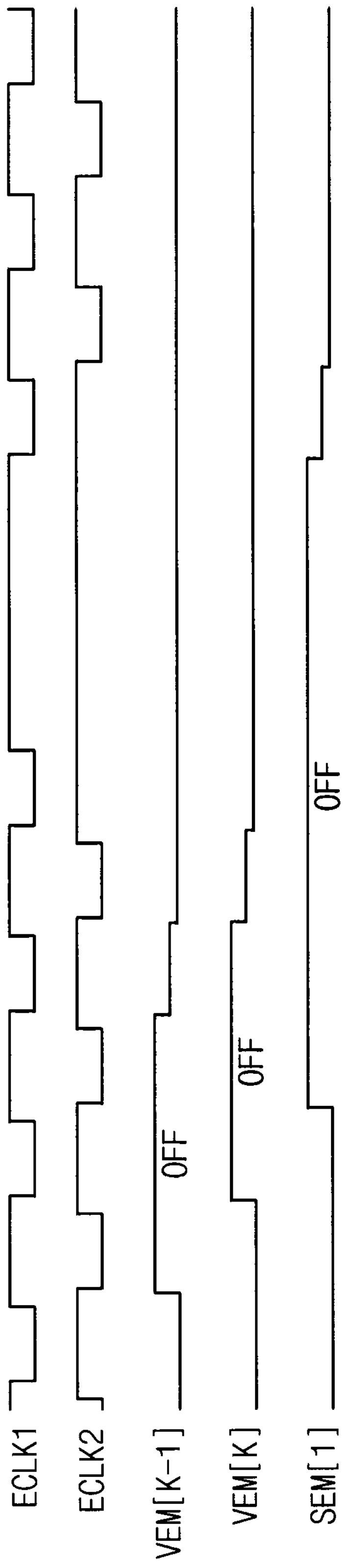
FIG. 11 is a timing diagram illustrating an emission clock signal applied to the emission driver of FIG. 1 and an emission signal controlled based on the emission clock signal and generated by the emission driver of FIG. 1.

FIG. 11 is a timing diagram illustrating an emission clock signal ECLK1 and ECLK2 applied to the emission driver 600 of FIG. 1 and an emission signal VEM and SEM controlled based on the emission clock signal ECLK1 and ECLK2 and generated by the emission driver 600 of FIG. 1.

Referring to FIG. 11, the moving image emission signal VEM and the still image emission signal SEM may be controlled based on an emission clock signal ECLK1 and ECLK2. In one embodiment, for example, the emission clock signal ECLK1 and ECLK2 may include a first emission clock signal ECLK1 and a second emission clock signal ECLK2. The first emission clock signal ECLK1 and the second emission clock signal ECLK2 may control the width of the non-emission period of the moving image emission signal VEM outputted to the first display area (the moving image display area) and the width of the non-emission period of the still image emission signal SEM outputted to the second display area (the still image display area) differently from each other.

In an embodiment, a width of an activation duration of the emission clock signal in the second driving frequency may be greater than a width of an activation duration of the emission clock signal in the first driving frequency. In FIG. 11, the activation duration of the emission clock signal is illustrated as a high period in which the emission clock signal has a high level.

The moving image emission signal VEM and the still image emission signal SEM may be output in synchronization with a falling edge of the emission clock signal. The moving image emission signal VEM and the still image emission signal SEM may decrease from a first high level to a second high level in synchronization with one of the falling edges of the emission clock signals ECLK1 and ECLK2. The moving image emission signal VEM and the still image emission signal SEM may decrease from a second high level to a low level in synchronization with another falling edge among the emission clock signals ECLK1 and ECLK2. In one embodiment, for example, when the width of the activation duration of the emission clock signal in the second display area (the still image display area) is greater than the width of the activation duration of the emission clock signal in the first display area (the moving image display area), the width of the non-emission period of the still image emission signal SEM may be increased in response to the falling edge among the emission clock signals.

Figure 12:
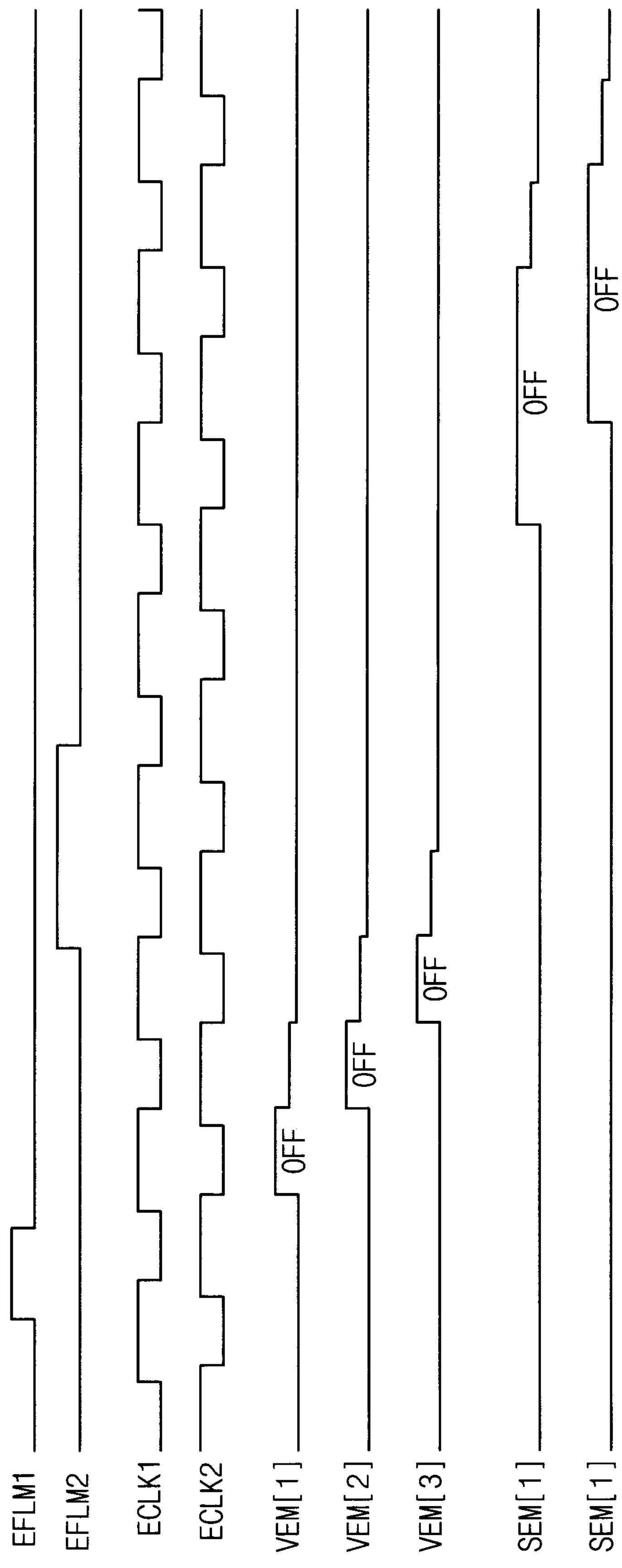
FIG. 12 is a timing diagram illustrating a first emission start signal and a second emission start signal applied to an emission driver of a display apparatus according to an embodiment of the invention, and an emission signal generated by the emission driver and controlled based on the first emission start signal and the second emission start signal.

FIG. 12 is a timing diagram illustrating a first emission start signal EFLM1 and a second emission start signal EFLM2 applied to an emission driver 600 of a display apparatus according to an embodiment of the invention, and an emission signal VEM and SEM generated by the emission driver 600 and controlled based on the first emission start signal EFLM1 and the second emission start signal EFLM2.

Figure 13:
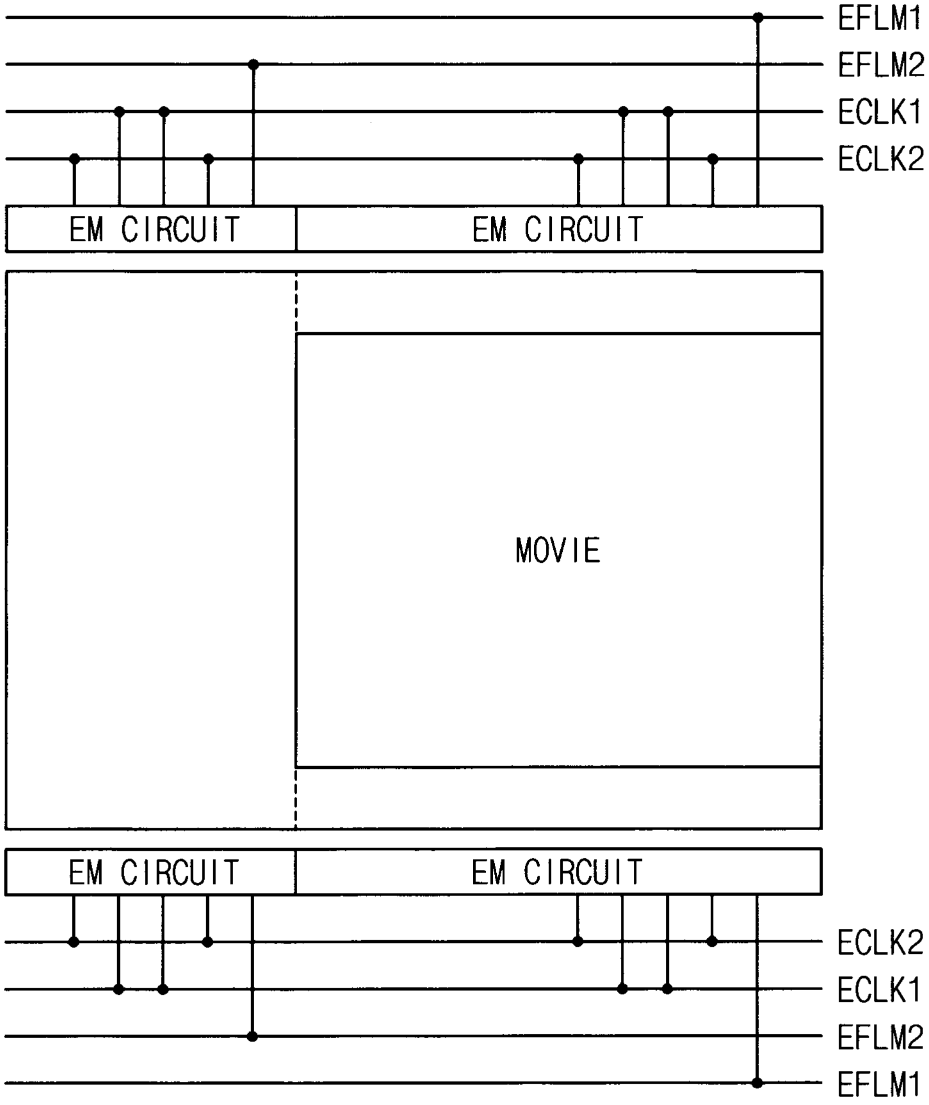
FIG. 13 is a conceptual diagram in which a first emission start signal and a second emission start signal of FIG. 10 are connected to a moving image display area and a still image display area of the display panel.

FIG. 13 is a conceptual diagram in which a first emission start signal EFLM1 and a second emission start signal EFLM2 of FIG. 10 are connected to each moving image display area of the display panel and a still image display area of the display panel.

Referring to FIGS. 12 and 13, the moving image emission signal VEM and the still image emission signal SEM may be controlled based on a first emission start signal EFLM1 and a second emission start signal EFLM2. The first emission start signal EFLM1 and the second emission start signal EFLM2 may control the width of the non-emission period of the moving image emission signal VEM outputted to the first display area (the moving image display area) and the width of the non-emission period of the still image emission signal SEM outputted to the second display area (the still image display area) differently from each other.

In an embodiment, the non-emission period of the moving image emission signal VEM may be determined according to the first emission start signal EFLM1, and the non-emission period of the still image emission signal SEM may be determined based on the emission start signal EFLM2. A width of an activation duration of the second emission start signal EFLM2 may be greater than a width of an activation duration of the first emission start signal EFLM1. In FIG. 12, the activation duration of the first emission start signal EFLM1 and the activation duration of the second emission start signal EFLM2 are illustrated as a duration of a high level.

Positions of the first display area (the moving image display area) and the second display area (the still image display area) may be fixed on the display panel 100. More specifically, the emission driver 600 may include a first emission driver 610 which outputs a moving image emission signal VEM based on the first emission start signal EFLM1 to the first display area (the moving image display area) and may include a second emission driver 620 which outputs a still image emission signal SEM based on the second emission start signal EFLM2 in the second display area (the still image display area). In one embodiment, for example, the display panel 100 may be a foldable display.

In such an embodiment, the positions of the first display area (the moving image display area) and the second display area (the still image display area) may be not fixed on the display panel 100, but may vary according to the input image data IMG.

Figure 14:
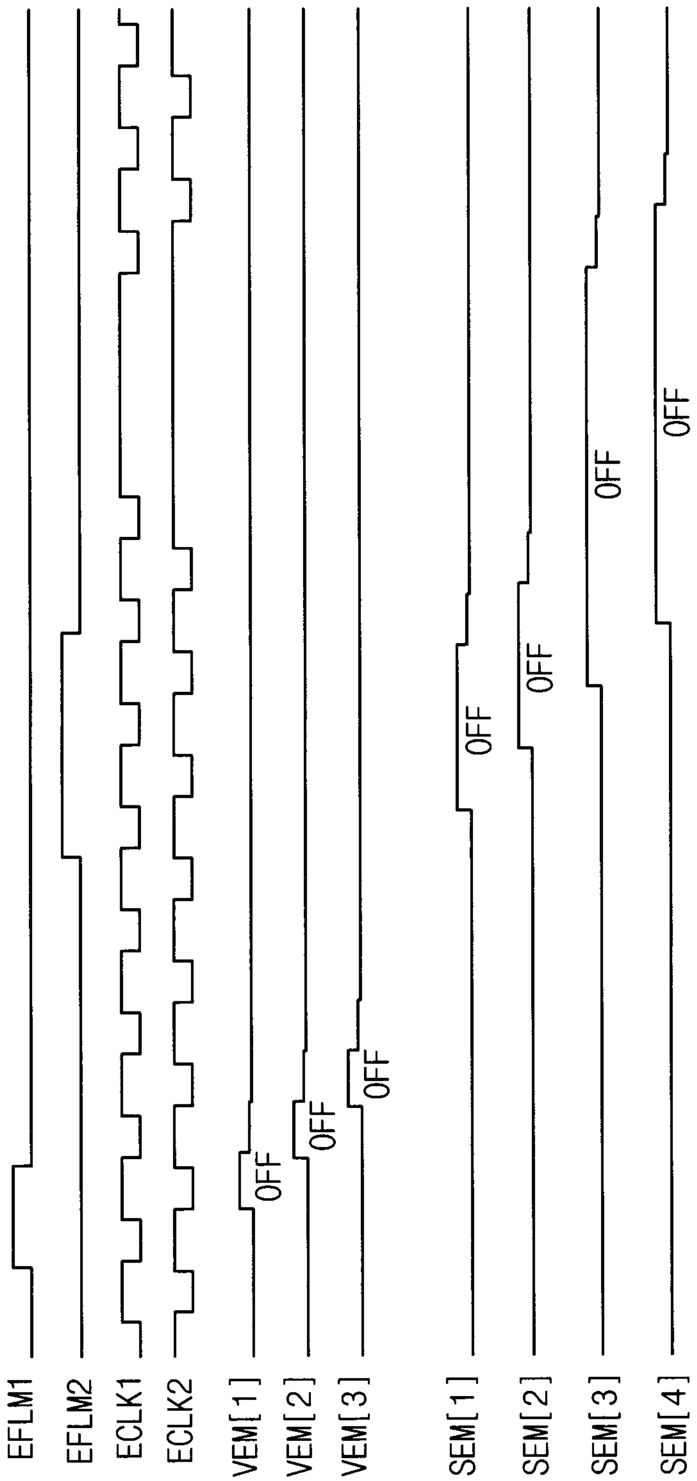
FIG. 14 is a timing diagram illustrating an emission clock signal, a first emission start signal and a second emission start signal applied to an emission driver of a display apparatus according to an embodiment of the invention, and an emission signal generated by the emission driver based on the emission clock signal, the first emission start signal and the second emission start signal.

FIG. 14 is a timing diagram illustrating an emission clock signal ECLK1 and ECLK2, a first emission start signal EFLM1 and a second emission start signal EFLM2 applied to an emission driver 600 of a display apparatus according to an embodiment of the invention, and an emission signal VEM and SEM generated by the emission driver 600 based on the emission clock signal ECLK1 and ECLK2, the first emission start signal EFLM1 and the second emission start signal EFLM2.

Referring to FIG. 14, the moving image emission signal VEM and the still image emission signal SEM may be controlled by adjusting the width of the activation duration of an emission clock signal ECLK1 and ECLK2, the width of the activation duration of a first emission start signal EFLM1, and the width of the activation duration of a second emission start signal EFLM2. The emission clock signal ECLK1 and ECLK2, the first emission start signal EFLM1, and the second emission start signal EFLM2 may control the width of the non-emission period of the moving image emission signal VEM outputted to the first display area (the moving image display area) and the width of the non-emission period of the still image emission signal SEM outputted to the second display area (the still image display area) differently.

According to an embodiment, the width of the non-emission period of the still image emission signal SEM, which is already adjusted based on the emission clock signal, may be more finely controlled based on the second emission start signal EFLM2. Accordingly, in such an embodiment, a difference of luminance between the first display area (the moving image display area) and the second display area (the still image display area) may be further reduced.

According to embodiments of the display apparatus and the method of driving the display panel, as described herein, the display quality of the display panel may be enhanced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel including a pixel which displays an image based on input image data, wherein the display panel comprising a first display area that is controlled by a first driving frequency and a second display area that is controlled by a second driving frequency less than the first driving frequency; and an emission driver which outputs a moving image emission signal corresponding to the first driving frequency and a still image emission signal corresponding to the second driving frequency to the display panel, wherein a width of a non-emission period of the moving image emission signal and a width of a non-emission period of the still image emission signal are controlled by adjusting at least one of the moving image emission signal and the still image emission signal based on a driving frequency of the one of the at least one of the moving image emission signal and the still image emission signal such that a luminance of the second display area is substantially the same as a luminance of the first display area.

2. The display apparatus of claim 1, wherein when only the moving image or only the still image is displayed on the display panel, the display panel determines the driving frequency to be a fixed driving frequency, and the emission driver outputs an emission signal having a constant width of a non-emission period to the display panel.

3. The display apparatus of claim 2, wherein the width of the non-emission period of the still image emission signal is constant, and wherein the width of the non-emission period of the moving image emission signal is adjusted to decrease, such that the width of the non-emission period of the still image emission signal becomes greater than the width of the non-emission period of the moving image emission signal.

4. The display apparatus of claim 2, wherein the width of the non-emission period of the moving image emission signal is constant, and wherein the width of the non-emission period of the still image emission signal is adjusted to increase, such that the width of the non-emission period of the still image emission signal becomes greater than the width of the non-emission period of the moving image emission signal.

5. The display apparatus of claim 2, wherein the moving image emission signal and the still image emission signal are controlled based on an emission clock signal.

6. The display apparatus of claim 5, wherein a width of an activation duration of the emission clock signal in the second driving frequency is greater than a width of an activation duration of the emission clock signal in the first driving frequency.

7. The display apparatus of claim 5, wherein the moving image emission signal and the still image emission signal are outputted in synchronization with a falling edge of the emission clock signal.

8. The display apparatus of claim 2, wherein the moving image emission signal and the still image emission signal are controlled based on a first emission start signal and a second emission start signal.

9. The display apparatus of claim 8, wherein the non-emission period of the moving image emission signal is determined based on the first emission start signal, wherein the non-emission period of the still image emission signal is determined based on the second emission start signal, and wherein a width of an activation duration of the second emission start signal is greater than a width of an activation duration of the first emission start signal.

10. The display apparatus of claim 8, wherein positions of the first display area and the second display area are fixed on the display panel.

11. The display apparatus of claim 2, wherein the moving image emission signal and the still image emission signal are controlled by adjusting a width of an activation duration of an emission clock signal, an activation duration of a first emission start signal, and an activation duration of a second emission start signal.

12. A display apparatus comprising:

a display panel including a pixel which displays an image based on input image data, wherein the display panel comprising a first display area that is controlled by a first driving frequency and a second display area that is controlled by a second driving frequency less than the first driving frequency; and an emission driver which outputs a moving image emission signal corresponding to the first driving frequency and a still image emission signal corresponding to the second driving frequency to the display panel, wherein a width of a non-emission period of the moving image emission signal and a width of a non-emission period of the still image emission signal are controlled by adjusting an emission signal based on a driving frequency such that a luminance of the second display area is substantially the same as a luminance of the first display area;

wherein when only the moving image or only the still image is displayed on the display panel, the display panel determines the driving frequency to be a fixed driving frequency, and the emission driver outputs an emission signal having a constant width of a non-emission period to the display panel; and wherein the width of the non-emission period of the moving image emission signal is adjusted to decrease, such that the width of the non-emission period of the still image emission signal becomes greater than the width of the non-emission period of the moving image emission signal.

13. A display apparatus comprising:

a display panel including a pixel which displays an image based on input image data, wherein the display panel comprising a first display area that is controlled by a first driving frequency and a second display area that is controlled by a second driving frequency less than the first driving frequency; and an emission driver which outputs a moving image emission signal corresponding to the first driving frequency and a still image emission signal corresponding to the second driving frequency to the display panel, wherein a width of a non-emission period of the moving image emission signal and a width of a non-emission period of the still image emission signal are controlled by adjusting an emission signal based on a driving frequency such that a luminance of the second display area is substantially the same as a luminance of the first display area; and wherein when only the moving image or only the still image is displayed on the display panel, the display panel determines the driving frequency to be a fixed driving frequency, and the emission driver outputs an emission signal having a constant width of a non-emission period to the display panel; and wherein the moving image emission signal and the still image emission signal are controlled by adjusting a width of an activation duration of an emission clock signal, an activation duration of a first emission start signal, and an activation duration of a second emission start signal.

14. The display apparatus of claim 13, wherein the width of the non-emission period of the still image emission signal is constant, and wherein the width of the non-emission period of the moving image emission signal is adjusted to decrease, such that the width of the non-emission period of the still image emission signal becomes greater than the width of the non-emission period of the moving image emission signal.

15. The display apparatus of claim 13, wherein the width of the non-emission period of the moving image emission signal is constant, and wherein the width of the non-emission period of the still image emission signal is adjusted to increase, such that the width of the non-emission period of the still image emission signal becomes greater than the width of the non-emission period of the moving image emission signal.

16. The display apparatus of claim 13, wherein the moving image emission signal and the still image emission signal are controlled based on an emission clock signal.

17. The display apparatus of claim 16, wherein a width of an activation duration of the emission clock signal in the second driving frequency is greater than a width of an activation duration of the emission clock signal in the first driving frequency.

18. The display apparatus of claim 16, wherein the moving image emission signal and the still image emission signal are outputted in synchronization with a falling edge of the emission clock signal.

19. The display apparatus of claim 13, wherein the moving image emission signal and the still image emission signal are controlled based on a first emission start signal and a second emission start signal.

20. The display apparatus of claim 19, wherein the non-emission period of the moving image emission signal is determined based on the first emission start signal, wherein the non-emission period of the still image emission signal is determined based on the second emission start signal, and wherein a width of an activation duration of the second emission start signal is greater than a width of an activation duration of the first emission start signal.

* * * * *